Oct. 30, 1962 J. B. JONES, JR 3,061,293
OFF-GAS COLLECTOR FOR SHAFT KILNS AND THE LIKE
Filed May 16, 1960 2 Sheets-Sheet 1

INVENTOR.
JOHN B. JONES, JR.
BY
ATTORNEY

Oct. 30, 1962 J. B. JONES, JR 3,061,293
OFF-GAS COLLECTOR FOR SHAFT KILNS AND THE LIKE
Filed May 16, 1960 2 Sheets-Sheet 2

INVENTOR.
JOHN B. JONES, JR.
BY
ATTORNEY

United States Patent Office 3,061,293
Patented Oct. 30, 1962

3,061,293
OFF-GAS COLLECTOR FOR SHAFT KILNS AND THE LIKE

John B. Jones, Jr., Denver, Colo., assignor to Cameron and Jones, Incorporated, Denver, Colo., a corporation of Colorado
Filed May 16, 1960, Ser. No. 29,549
4 Claims. (Cl. 263—29)

This invention relates to equipment, such as shaft kilns and analogous structures, of wide significance in the industrial arts for the conditioning and treatment of various materials in granular, or other, discrete broken or comminuted form amenable to flow under the influence of gravity in exposure to treating and conditioning influences thereto supplied as, or for the generation of, gases capable of uprise in counter-current relation to the flow of material, and has as an object to provide novel and improved means for efficiently collecting and continuously salvaging the gas output from such operations.

A further object of the invention is to provide novel and improved means for the collection and salvaging of gas output from operations incident to the conditioning and treatment of discrete materials that is expedient of adaptation to efficient particular use with treating and conditioning equipment of diverse shape, size, specific applicability, and structural particularity.

A further object of the invention is to provide novel and improved means for the collection and salvaging of gas output from operations incident to the conditioning and treatment of diverse discrete materials that is practical of operative association with and through the variable range of treating and conditioning equipment in appropriate capacity proportion therewith.

A further object of the invention is to provide novel and improved means for the collection and salvaging of gas output from operations incident to the conditioning and treatment of diverse discrete materials that is efficiently operable in appropriate structural particularity to recover the entire gas output from a given operation for direction through a closed circuit to subsequent processing thereof.

A further object of the invention is to provide novel and improved means for the collection and salvaging of gas output from operations incident to the conditioning and treatment of discrete materials that is amenable to structural embodiment through the use of materials and the application of techniques commonly available.

A further object of the invention is to provide a novel and improved construction and operative combination of elements constituting means for the collection and salvaging of gas output from operations incident to the conditioning and treatment of diverse discrete materials.

With the foregoing and other objects in view, my invention consists in the construction, arrangement, and operative correlation of elements hereinafter set forth, pointed out in my claims, and illustrated by the accompanying drawings, in which—

Shaft kilns, and analogous equipment, for the confinement and direction of a charge of discrete solid material continuously passed therethrough under the influence of gravity in exposure to treating and conditioning influences, such as heat, gases, vapor input, and the like, supplied thereto are conventional industrial facilities extensively utilized, usually as large-capacity units, in considerable diversity of structure and operative practicality. Common to all such methods is the practice of constantly feeding the charge materials through the upper end of a receiving vessel in quantity and at a rate to maintain the vessel interior transversely filled with a material charge of substantial depth, supplying the conditioning and treating influences to the vessel below the charge for uprise therethrough, and of continuously removing lower components of the charge through the lower end of the vessel with concentration of vapor output from the operation above the vessel charge for release thence to atmosphere or direction to subsequent processing, or other discharge. The gas output from conditioning and treating operations of the type and nature just discussed frequently entrains particulate and vaporous constituents meriting recovery, and the instant invention is hence directed to the provision of a particular and efficient organization for the collection, salvaging, and closed-circuit routing of the gas output from equipment of shaft kiln, or analogous, type through means and arrangements adaptable to widely-variable constructions of the equipment with accommodation of continuous material infeed thereto.

Figure 1:
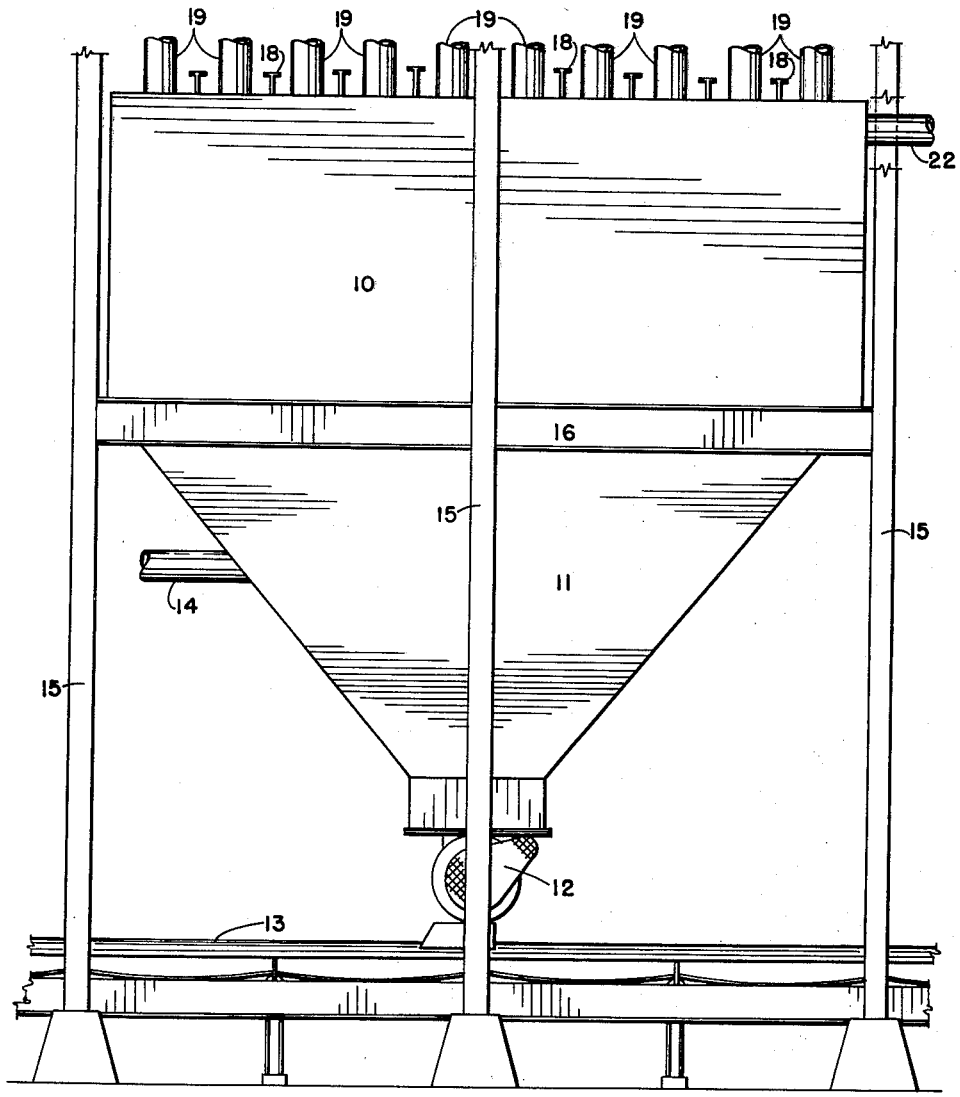
FIGURE 1 is a somewhat-diagrammatic, side-elevational view of a transversely-rectangular, generally-convention shaft kiln structure equipped with the improvement of the instant invention.

Typical of the equipment wherewith the improvements of the invention are adapted to be advantageously associated, FIGURE 1 shows in side elevation a transversely-rectangular shaft kiln structure comprising an elevated receiving vessel 10, a downwardly-convergent hopper 11 associated with the lower end of the vessel 10 for the reception of treated material conventionally released from the vessel and the delivery thereof through a discharge valve 12 to a conveyor 13, and a line 14 delivering to the hopper 11 for the input of treating and conditioning influences beneath the charge of the vessel 10 for uprise therethrough, as is customary practice; a supporting structure of columns 15 and beams 16 exemplifying the requisite supplementing features of a complete such installation.

Primary to realization of the purposes of the invention is the provision in treating and conditioning equipment typified as shown and described of means inhibiting escape from the vessel 10 of the vaporous uprise through the charge thereof while accommodating gravity infeed of charge material thereto. Manifestly susceptible of multiform structural organization, the means for blocking escape of vaporous uprise from within the vessel 10 is represented in the illustrated embodiment of the invention as a rigid closure 17 marginally sealed to and fixedly and horizontally traversing the otherwise open upper end of said vessel in supported association with beams 18, or equivalent sustaining members. The closure 17 is imperforate save for expedient adaptation thereof to accommodate gravity-influenced infeed of charge material therethrough and to the interior of the vessel 10 thereby covered, a practical, but in no sense limitative, arrangement for efficient material infeed to the vessel being illustrated as a plurality of like, tubular conduits 19 fixed to and for flow delivery through said closure in a symmetrical patterned array communicating with and for individual transmission of charge material flow from a bulk supply of the material thereabove, all in a manner and through means, not shown, but representative of the environment whereto the invention is applicable and susceptible of wide structural diversity immaterial to the operative concept and functional organization thereof.

Manifestly, in the absence of charge material flow therewithin, the conduits 19 or equivalent infeed arrangements, provide paths of escape for the gases and vapors confined by the closure 17 in the upper portion of the vessel 10, but during characteristic continuous operation of the equipment the material infeed features thereof are filled with charge material inflowing to the vessel in a manner and to a degree effectively opposing any appreciable outflow of gas or vapor from the vessel therethrough.

Figure 2:
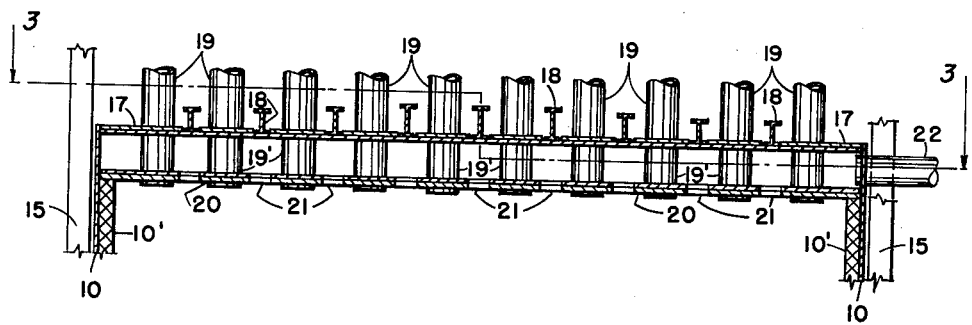
FIGURE 2 is a vertical section transversely through the upper end portion of the organization according to FIGURE 1, taken substantially on the indicated line 2—2 of FIGURE 3.
Figure 3:
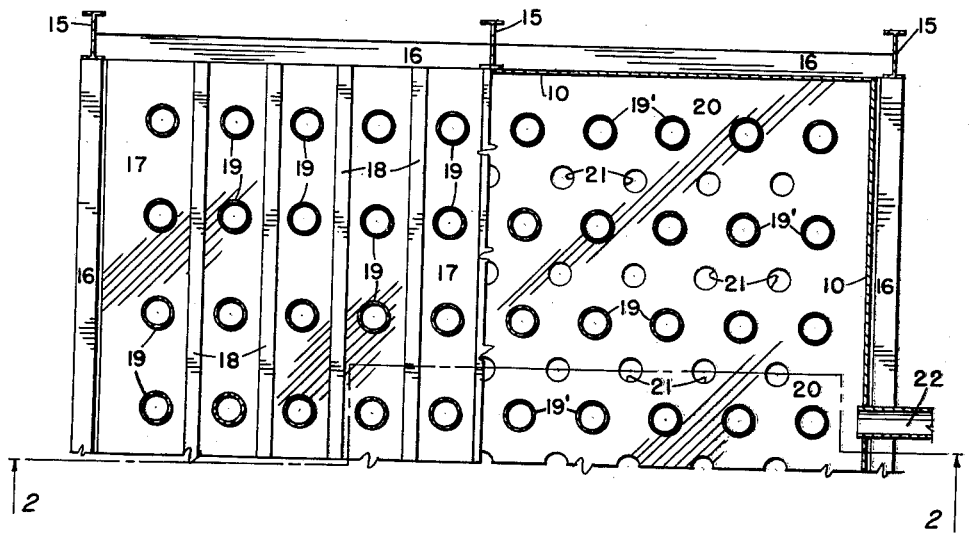
FIGURE 3 is a half-top, plan view of the structure according to FIGURE 1 in partial section as viewed from the off-set planes indicated by the line 3—3 of FIGURE 2.

In furtherance of the concept and purposes of the invention the closure 17 is utilized as the upper complement of a collecting chamber defined interiorly of the vessel 10 by a rigid panel 20 fixed to close transversely thereof in spaced relation beneath, and preferably parallel to, said closure, to and through which panel downward extensions 19′ of the conduits 19, or equivalent infeed arrangements, fixedly engage for flow delivery therebelow in an association effective to sustain said panel in secure correlation with the closure and vessel. Thus closed against ingress of charge material incoming to the vessel while accommodating unobstructed material infeed therethrough, the chamber established between the closure 17 and panel 20 is conditioned to receive and to collect vaporous uprise interiorly of the vessel through the provision of apertures 21 intersecting the said panel areas between the conduit extensions 19′ in any appropriate size, number, and patterned arrangement, desirably as a symmetrical array of correspondingly-sized openings, and to consequently segregate the collected uprise for direction to subsequent processing or desired ultimate disposition through an outflow line, or lines, 22 leading laterally of the vessel 10 therefrom. Obviously, and whenever operatively appropriate, the line, or lines, 22 may be made subject to reduced interior pressure, as by means of a pump, or otherwise, for evacuation of collected vapors with suction effect from the chamber served thereby, and, as indicated in FIGURE 2, inner surface areas of said chamber may be lined, coated, or insulated to properly satisfy the operating requirements of any equipment installation and its particular function. As is usual, the vessel 10 utilized for an operation involving elevated temperatures may be provided with a refractory lining 10′.

Operation of the improvement shown and described, and the advantages thereof, should be readily apparent. With a collecting chamber capacity determined by the spacing between the closure 17 and panel 20, chamber inflow capacity deriving from the size and number of the apertures 21, and outflow rate and capacity established by the size, number, and pressure characteristics of the line, or lines, 22 properly proportioned and correlated to the material treatment, or conditioning, wherefor the equipment is designed, infeed of charge material through the conduits 19, or their equivalent, and input of treating influences through the line 14 are reflected by vaporous uprise interiorly through the vessel and its charge which is constrained to enter and be collected in the chamber upwardly terminating and closing the vessel for evacuation thence through the outflow line or lines thereof, all in a manner, and through agencies, amenable to structural adaptation, variable combination, and functional regulation suited to the particularities of use and construction distinguishing the conventional environment wherein the invention is operable.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. In shaft kiln equipment of the type wherein discrete particulate material is continuously fed downwardly into an enclosed material processing chamber solely through material input conduit means communicating with said material processing chamber below a predetermined vertical level, and wherein the material is thereafter passed downwardly through said material processing chamber to a material outlet port counter-current to an upward flow of a vaporous medium through the chamber, the combination therewith of separate enclosed gas chamber means disposed above said predetermined level and operatively associated with said material processing chamber to provide the sole effective outlet path for vapor moving through said material processing chamber, said separate gas chamber means having said material input conduit means passing therethrough and sealed therefrom, said separate gas chamber means having a bottom wall with openings therein communicating said separate gas chamber means with said material processing chamber, outlet conduit means communicating with said separate gas chamber means in spaced relation to said openings, the communication between said separate gas chamber means and said material processing chamber and said separate gas chamber means and said outlet conduit means providing the sole paths to the interior of said separate gas chamber means.

2. The combination defined in claim 1 wherein said material input means comprises a plurality of separate input conduits, and wherein each of said input conduits has an outlet end disposed substantially in the plane of said bottom wall of said separate gas chamber.

3. The combination defined in claim 1 wherein said bottom wall of said separate gas chamber means is formed by an apertured plate member and wherein said apertured plate member also forms the top end of said material processing chamber.

4. The combination defined in claim 1 wherein said outlet conduit means communicates with said separate gas chamber means laterally of said separate gas chamber means and said material processing chamber.

References Cited in the file of this patent
UNITED STATES PATENTS

| | | |
|---|---|---|
| 1,836,301 | Bechtold | Dec. 15, 1931 |
| 2,416,214 | Payne | Feb. 18, 1947 |
| 2,451,024 | Ellerbeck | Oct. 12, 1948 |
| 2,477,019 | Utterback et al. | July 26, 1949 |
| 2,499,704 | Utterback et al. | Mar. 7, 1950 |